(12) United States Patent
Al-Qahtani et al.

(10) Patent No.: US 8,075,846 B2
(45) Date of Patent: Dec. 13, 2011

(54) PRESSURE CONTROL SYSTEM

(75) Inventors: Mushaeb Z. Al-Qahtani, Al-Jubail Industrial City (SA); David Laborde, Al-Jubail Industrial City (SA); Ahmed Al-Thawadi, Al-Jubail Industrial City (SA)

(73) Assignee: Jubail Petrochemical Co. "Kemya", Al-Jubail (SA)

( * ) Notice: Subject to any disclaimer, the term of this patent is extended or adjusted under 35 U.S.C. 154(b) by 484 days.

(21) Appl. No.: 11/989,180

(22) PCT Filed: Jul. 21, 2006

(86) PCT No.: PCT/US2006/028550
§ 371 (c)(1),
(2), (4) Date: Mar. 13, 2009

(87) PCT Pub. No.: WO2007/014103
PCT Pub. Date: Feb. 1, 2007

(65) Prior Publication Data
US 2009/0202395 A1 Aug. 13, 2009

(30) Foreign Application Priority Data
Jul. 22, 2005 (EP) .................................... 05015949

(51) Int. Cl.
*B01J 3/00* (2006.01)

(52) U.S. Cl. ......... 422/242; 422/213; 422/219; 422/295

(58) Field of Classification Search .................. 422/242, 422/295, 213, 219, 131
See application file for complete search history.

(56) References Cited

U.S. PATENT DOCUMENTS

| 2,655,411 | A | * | 10/1953 | Smith | 406/63 |
| 2,716,050 | A | | 8/1955 | Hagerbaumer | |
| 3,012,024 | A | * | 12/1961 | Kavesh | 526/86 |
| 3,198,605 | A | * | 8/1965 | Bayles | 422/219 |
| 3,876,602 | A | * | 4/1975 | Calvert et al. | 526/86 |
| 4,162,894 | A | * | 7/1979 | Tribble | 526/61 |
| 5,356,599 | A | | 10/1994 | Miura et al. | |
| 5,433,924 | A | * | 7/1995 | Sagar et al. | 422/131 |

(Continued)

FOREIGN PATENT DOCUMENTS

GB 896 786 5/1962

(Continued)

OTHER PUBLICATIONS

International Search Report; International Application No. PCT/US2006/028550; International Filing Date: Jul. 21, 2006; Date of Mailing: Nov. 2, 2006; 3 pages.

(Continued)

*Primary Examiner* — Walter D Griffin
*Assistant Examiner* — Huy-Tram Nguyen
(74) *Attorney, Agent, or Firm* — Cantor Colburn LLP

(57) ABSTRACT

The present invention relates to a pressure control system for maintaining the pressure differential between a reactor (1) and a feeder (2) connected thereto and provided for introducing feed into the reactor (1), characterized in that the pressure control system comprises a pressure up line (5) and a pressure release line (6), each line (5, 6) having a control valve (7, 8), both lines (5, 6) combining into one main line (3) leading to the feeder (2), wherein a filter unit (4) is provided in the main line (3); as well as to a reactor having such a pressure control system and a process utilizing a reactor with the specific pressure control system.

18 Claims, 2 Drawing Sheets

Figure 1:
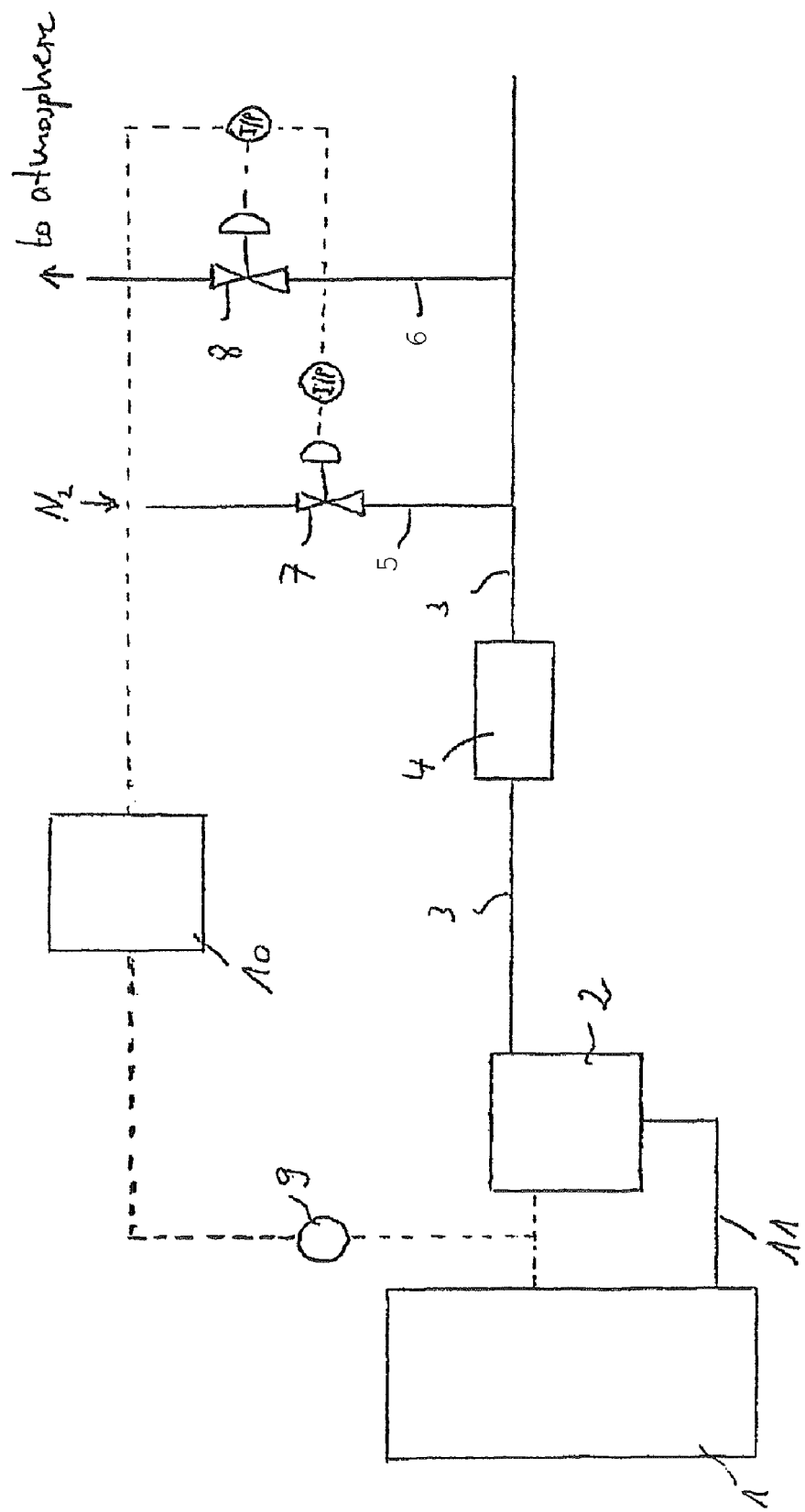

U.S. PATENT DOCUMENTS 6,319,995 B2 * 11/2001 Glenn et al. .................... 526/64
2003/0098069 A1 * 5/2003 Sund et al. ................ 137/487.5

FOREIGN PATENT DOCUMENTS

WO WO 00/20098 4/2000

OTHER PUBLICATIONS

Written Opinion of the International Searching Authority; International Application No. PCT/US2006/028550; International Filing Date Jul. 21, 2006; Date of Mailing Nov. 2, 2006; 5 pages.

* cited by examiner

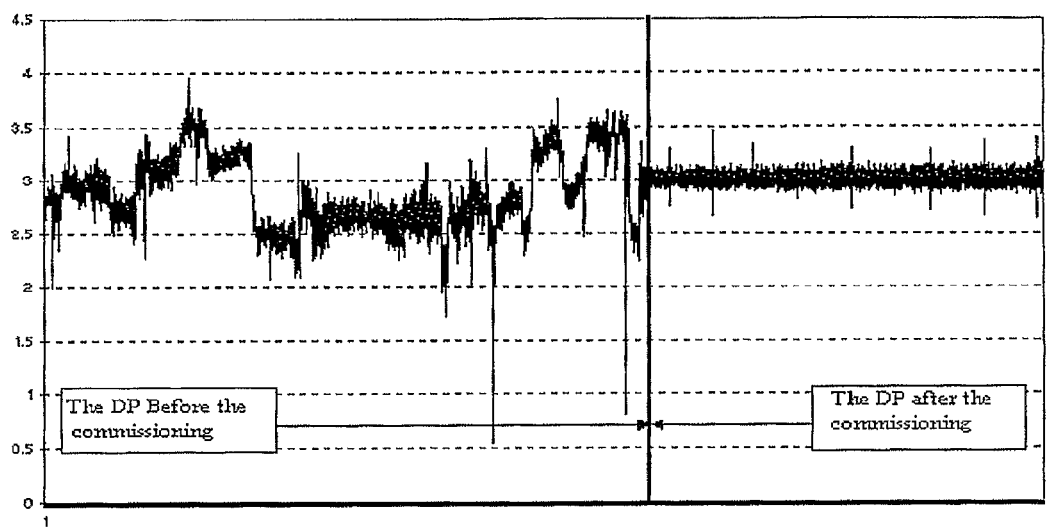
Fig: 2

PRESSURE CONTROL SYSTEM

The present invention relates to a pressure control system for maintaining the pressure differential between a reactor and a feeder connected thereto and provided for introducing feed into the reactor, and a reactor having such a pressure control system and a process utilizing a reactor with an inventive pressure control system.

Industrial processes requiring an introduction of a feed, preferably continuous or intermittent, into a reactor are widely known. If the chemical reaction in the reactor is carried out at a specific pressure, the feed has to be introduced into the reactor at a pressure being somewhat higher than the pressure present in the reactor. Thus, the pressure differential between the reactor and the feeder is the driving force needed to meter the feed into the reactor. A specific example of an industrial process is the gas phase polymerization of, e.g., ethylene wherein catalyst feed has to be introduced into the reactor, preferably in a continuous or intermittent manner. In the gas phase polymerization process, the catalyst is fed from the feeder using a metering device comprising a rotating disc and a stationary disc. The stationary disc has a fixed number of holes whereas the rotating disc has many more holes. Once the holes from both discs are directly on top of each other, the catalyst feed may be transferred into the reactor. The quantity of the feed, of course, depends on the speed of the rotating disc. Generally, the pressure deviation occurs due to the blockages in grooves of the rotating disc. These blockages become increasingly problematic as the gap between the upper stationary disc and the lower rotating disc begins to increase due to mechanical wear and tear. As the catalyst slurry builds up due to the blockage, the pressure inside the feeder increases, thereby force injecting the catalyst slurry into the reaction zone where it comes into contact with the monomer. Occasionally, the pressure build up is so high that it triggers off the emergency shut down system. The gas phase polymerization of ethylene may be usually carried out at a pressure in the reactor of about 20 to 30 barg. It has been found that pressure changes of about 0.5 barg often take place, and the pressure rises in about one minute and the pressure falls to the starting value in about 30 minutes.

Any problems with the pressure differential (DP) will thus adversely lead to the loss of catalyst feed rate which in turn gives rise to a host of problems in terms of process parameters, product quality, plant safety and maintenance. In addition, an unexpected surge in pressure may activate a pressure isolation system (emergency pressure trip) and may lead into a process shut down leading to undesirable problems in terms of production losses, clean ups and extra maintenance.

Thus, the pressure differential between the reactor and the feeder has to be controlled within a very narrow band in order to have a controlled amount of catalyst flowing into the reactor.

So far, the pressure inside the feeder, and thus the pressure differential between the reactor and the feeder, was controlled by providing a source of inert gas to pressure up the feed. However, the provision of suitably pressurized inert gas only resulted in a poor controlling of the pressure differential and was demonstrated as being not fast enough to respond to sudden pressure changes. If, for example, the feed is a catalyst, a sudden change in the feeder pressure will thus force more catalyst to flow in the reactor, which in turn will increase the temperature and cut the rate. It may also lead to complete termination of the reaction.

The instability in the reactor leads to a decreased productivity. For the gas phase polymerization of ethylene it has been found that instability is mainly present after the feeder has been freshly filled, and production rates have been typically reduced of about 5 tons/hour and remained lower for a minimum of 4-6 hours until the conditions were stabilized. As it was found that such instabilities could occur 2-3 times a week and even more frequent on high density campaigns which are operated with high density catalysts, each event can reduce the production by 25-50 tons.

Thus, it is an object of the present invention to provide a pressure control system for maintaining the pressure differential between a reactor and a feeder which overcomes the drawbacks of the prior art. Especially a pressure control system shall be provided showing improved reliability, continuity, cost effectivity and safety, wherein fluctuations of the pressure differential are overcome or at least minimized.

Additionally, it is a further object to provide a reactor having an inventive pressure control system, as well as a process utilizing the reactor having this inventive pressure control system.

The first object is achieved in that the pressure control system comprises a pressure up line and a pressure release line, each line having a control valve, both lines combining into one main line leading to the feeder, wherein a filter unit is provided in the main line.

Preferably, the reactor is a gas phase reactor and the feed is a solid, liquid or slurry.

Most preferably, the feed contains a catalyst.

In one embodiment, the filter unit is a sintered metal filter.

Preferably, the pressure up line is connected to a source of inert gas, preferably nitrogen.

Additionally, the release line may release pressure from the feeder to atmosphere and may have at its end portion an enlarged cross section. This reduces the release velocity.

Preferably, the pressure differential between the reactor and the feeder is measured, preferably continuously, by a differential pressure transmitter.

Most preferably, the transmitter and the control valves are connected to a control device.

In one embodiment, the feed is metered into the reactor from the feeder using a metering device.

Preferably, the metering device is a metering disc rotating on top of a wear plate.

More preferably, the feed is continuously or intermittently fed into the reactor.

A further object is achieved by a reactor having an inventive pressure control system.

According to the invention, a process for carrying out chemical reaction in a reactor having an inventive pressure control system is provided.

Surprisingly, it was found that the inventive pressure control system utilized in a reactor system comprising a reactor and a feeder, presented excellent results and the pressure differential was maintained under all circumstances so that also the feeder pressure was maintained substantially constant. The inventive pressure control system provided improved reactor reliability, operation continuity and process safety, especially by eliminating run away reactions. Due to the steady state operation, also cost savings are achieved. The inventive pressure control system comprises a control release valve to release the pressure from the feeder which helps to avoid force feeding. A second control pressure up valve is provided to control the feeder pressure in case of low pressure. Further, a filter unit is provided to catch the feed material when the control release valve is opened to prevent feed material from being exposed to atmosphere. To provide a blow back mechanism for cleaning the filter unit, the arrangement of the filter unit is very important to keep the filter unit all the time under continuous cleaning. Therefore, the filter unit is located in the mainline before a tee connection splitting the main line into the pressure release line and the pressure up line. Thus, feed material which is carried away with pressure release is catched, and inert gas provided via the pressure up line can pass through the filter unit in the reversed direction for pressure up the feeder and cleaning of the filter unit.

Additional features and advantages of the inventive pressure control system will now become apparent from the detailed description of a preferred embodiment thereof with reference to the accompanying drawings, wherein FIG. 1 schematically illustrates, in simplified form, a reactor system utilizing an inventive pressure control system; and FIG. 2 illustrates a graph showing the pressure differential before utilizing the inventive pressure control system and after commissioning.

The inventive pressure control system may be advantageously utilized in the gas phase polymerization of ethylene, and the following detailed description is based on such a gas phase polymerization process. However, someone skilled in the art is aware that the inventive pressure control system may be utilized in any other reactor systems requiring the introduction of feed against the pressure being present in the reactor.

In FIG. 1 a reactor system is shown comprising a polymerization reactor 1 and a catalyst feeder 2 connected thereto via a line 11 and provided for introducing catalyst feed into the polymerization reactor 1. Any equipment of the reactor system being not necessary for the inventive pressure control system has been omitted for reasons of clarity. From the catalyst feeder 2 a main line 3 extends to a filter unit 4. After the filter unit 4 the main line splits up into a pressure up line 5 and a pressure release line 6. Both pressure up line 5 and pressure release line 6 each have a control valve 7, 8. The pressure release line 6 releases pressure to atmosphere, whereas the pressure up line 5 is connected to a source of inert gas, preferably nitrogen, to pressure up the catalyst feeder 2. The pressure differential between the reactor 1 and the catalyst feeder 2 can be measured by a pressure differential transmitter 9. The control valves 7, 8 and the transmitter 9 are connected to a control device 10 to control the pressure differential and the opening and closing of the valves 7 and 8. Known process calculation can be utilized for the design of valve, piping and filter specifications.

During operation of the reactor system illustrated in FIG. 1, the pressure differential between the reactor 1 and the catalyst feeder 2 is, preferably continuously, measured. In case the pressure differential is considered as being too high, the control device 10 activates control valve 8 in the release line 6 venting the pressure to atmosphere until the desired pressure differential is obtained and the control valve 8 may be closed. Due to the pressure flow, catalyst contained in the catalyst feeder 2 may be carried away, but is catched at the filter unit 4, preventing a release of catalyst to atmosphere which is cost effective and environmentally friendly.

In case, the pressure differential between the reactor 1 and the catalyst feeder 2 is considered as being too low, the control device 10 activates the control valve 7 in the pressure up line 5. Then, the control valve 7 opens and inert gas, preferably nitrogen, is introduced into the reactor system to pressure up the catalyst feeder 2 until the desired pressure is obtained. The inventive pressure control system thus aims to stabilize the pressure inside the catalyst feeder 2 from being too high or low.

In other words, catalyst slurry is fed from the catalyst feeder 2 into the reactor 1 through line 11. The pressure transmitter 9 is measuring the pressure difference between the reactor 1 and the catalyst feeder 2. The measured signal is sent to the control device 10 most preferably housed in a control room. The controller 10 is a split range controller and, based on the pressure difference and the set point, it will command one of the valves to operate to release or make up the pressure in case of high or low pressure in catalyst feeder 2. The main line 3 will carry both flows in and out, and the filter unit 4 catches any fines escaped during the venting process and the fines residue in the filter unit 4 will be cleaned automatically. Preferably, main line 3 is inclined above catalyst feeder 2 to enforce the fines to go down to the catalyst feeder 2 by gravity.

Excellent results for adjusting the pressure differential were obtained utilizing the inventive pressure control system. This is further outlined in FIG. 2 illustrating a graph of the pressure differential before and after commissioning of the inventive pressure control system. Before commissioning, the pressure differential between the reactor and the catalyst feeder 2 varied in a great extend, whereas after commissioning the pressure differential remained substantially constant.

The features disclosed in the foregoing description, in the claims or in the accompanying drawings may, both separately and in a combination thereof, be material for realizing the invention in diverse forms thereof.

The invention claimed is:

1. A pressure control system for maintaining the pressure differential between a reactor (1) and a feeder (2) connected thereto and provided for introducing feed into the reactor (1), characterized in that the pressure control system comprises a pressure up line (5) and a pressure release line (6), each line (5, 6) having a control valve (7, 8), both lines (5, 6) combining into one main line (3) leading to the feeder (2), wherein a filter unit (4) is provided in the main line (3).

2. The pressure control system according to claim 1, wherein the reactor (1) is a gas phase reactor.

3. The pressure control system according to claim 1, wherein the feed is a solid, liquid or slurry.

4. The pressure control system according to claim 3, wherein the feed contains a catalyst.

5. The pressure control system according to claim 1, wherein the filter unit is a sintered metal filter (2).

6. The pressure control system according to claim 1, wherein the pressure up line (5) is connected to a source of inert gas.

7. The pressure control system according to claim 6, wherein the inert gas is nitrogen.

8. The pressure control system according to claim 1, wherein the release line (6) releases pressure from the feeder (2) to atmosphere.

9. The pressure control system according to claim 8, wherein the release line (6) has at its end portion an enlarged cross section.

10. The pressure control system according to claim 1, wherein the pressure differential between the reactor (1) and the feeder (2) is measured by a differential pressure transmitter (9).

11. The pressure control system according to claim 10, wherein the transmitter (9) and the control valves (7, 8) are connected to a control device (10).

12. The pressure control system according to claim 1, wherein the feed is metered into the reactor from the feeder (2) using a metering device.

13. The pressure control system according to claim 12, wherein the metering device is a metering disc rotating on top of a wear plate.

14. The pressure control system according to claim 1, wherein the feed is continuously or intermittently fed into the reactor (1).

15. the pressure control system according to claim 1, wherein the feeder is located along the main line (3) between the pressure up line (5) and the reactor (1).

16. A reactor having a pressure control system for maintaining the pressure differential between the reactor (1) and a feeder (2) connected thereto and provided for introducing feed into the reactor (1), characterized in that the pressure control system comprises a pressure up line (5) and a pressure release line (6), each line (5, 6) having a control valve (7, 8), both lines (5, 6) combining into one main line (3) leading to the feeder (2), wherein a filter unit (4) is provided in the main line (3).

17. A process for carrying out a chemical reaction in a reactor having a pressure control system for maintaining the pressure differential between the reactor (1) and a feeder (2) connected thereto and provided for introducing feed into the reactor (1), characterized in that the pressure control system comprises a pressure up line (5) and a pressure release line (6), each line (5, 6) having a control valve (7, 8), both lines (5, 6) combining into one main line (3) leading to the feeder (2), wherein a filter unit (4) is provided in the main line (3).

18. A pressure control system comprising:
   a reactor (1);
   a filter (4) in one main line (3);
   a feeder (2) located in the main line (3) between the filter (4) and the reactor (1); and
   a pressure up line (5) and a pressure release line (6), each line (5, 6) having a control valve (7, 8), both lines (5, 6) combining into the main line (3) such that the filter (4) is between the feeder (2) and the pressure release line (6).

* * * * *